United States Patent Office 3,793,247
Patented Feb. 19, 1974

---

3,793,247
CURABLE EPOXIDE RESIN COMPOSITIONS CONTAINING BORON-TRICHLORIDE-TERTIARY AMINE COMPLEXES
George Latto Fleming, Saffron Walden, and Richard John Martin, Linton, England, assignors to Ciba-Geigy AG, Basel, Switzerland
No Drawing. Filed Aug. 9, 1971, Ser. No. 170,380
Claims priority, application Great Britain, Aug. 11, 1970, 38,648/70
Int. Cl. C08g 30/12
U.S. Cl. 260—47 EA                         8 Claims

ABSTRACT OF THE DISCLOSURE

Curable compositions comprise an epoxide resin and as heat-curing agent, a polycarboxylic acid or anhydride, an aromatic polyamine, a polycarboxylic acid polyhydrazide, a polyhydric phenol, dicyandiamide, or a compound having at least two primary amino groups directly attached to a 1,3,5-triazine nucleus, and as accelerator, a complex of boron trichloride with amine in which the amino nitrogen is solely tertiary. The curable compositions may be applied as a one-, two- or three-part pack whereby the accelerator may be incorporated in either the resin or the hardener part, or in both. They are useful as laminating resins, surface coating resins, sinter powders, dipping or casting resins and adhesives.

---

This invention relates to curable 1,2-epoxide resin compositions containing accelerators for the curing thereof, and to the products obtained by curing the compositions at an elevated temperature.

It is known that epoxide resins, i.e. substances containing on average more than one 1,2-epoxide group per molecule, may be cured, i.e. hardened, on reaction with various classes of substances to form products having valuable technical properties. With one class of curing agents, such as the alkylene polyamines, application of heat is usually unnecessary. With a second class, the so-called heat-curing agents, heat has to be applied so that cross-linking is substantially complete with a practically short time. Representative of this second class are polycarboxylic acids and their anhydrides, polycarboxylic acid polyhydrazides, polyhydric phenols, dicyandiamide, melamine and other compounds containing at least two primary amino groups directly attached to a 1,3,5-triazine nucleus (such as guanamine), and also aromatic polyamines.

To reduce the time required for heat curing, small amounts of substances which act as accelerators have been incorporated in the curable mixture. Such accelerators, while promoting rapid reaction at the curing temperature should, however, not induce cross-linking at the normal temperatures of storage and handling, otherwise the storage life or "pot-life" of the mixture would be inconveniently short. Accelerators which induce rapid curing at elevated temperatures yet have little effect on the resin when stored with it at about room temperature are known as "latent" accelerators, and many attempts have been made to find accelerators having as markedly a latent activity as possible.

Thus, tertiary amines have been used for accelerating curing with polycarboxylic acids, their anhydrides, polycarboxylic acid polyhydrazides, and polyhydric phenols. But many of the tertiary amines presently available exert only a modest effect, while others promote cross-linking at normal temperatures of use to an extent that the mixture of resin and curing agent gels prematurely. Tertiary amines have also been used to accelerate cure with dicyandiamide. A favorable feature of dicyandiamide-epoxy resin mixtures is that they are usually stable on prolonged storage at room temperature; on the other hand, they require high curing temperatures. Incorporating a minor amount of conventional tertiary amines generally does not adequately lower the requisite curing temperature, while mixtures containing larger amounts often cure prematurely on storage.

It has now been found that certain complexes of boron trichloride with tertiary amines may be used as accelerators and the aforesaid disadvantages largely or substantially overcome.

The present invention accordingly provides heat-curable compositions comprising:

(a) a 1,2-epoxide resin,
(b) a heat-curing agent therefor, and
(c) as accelerator for the curing action, a complex of boron trichloride with an amine in which the amino nitrogen is solely tertiary.

More particularly, the present invention provides heat-curable compositions comprising components (a) and (c) as aforesaid, and as component (b), a polycarboxylic acid, a polycarboxylic acid anhydride, an aromatic polyamine, a polycarboxylic acid polyhydrazide, a polyhydric phenol, dicyandiamide, or a compound having at least two primary amino groups directly attached to a 1,3,5-triazine nucleus.

Preferably the tertiary amine is a monotertiary amine, and the preferred complexes contain 1 molar proportion of the amine and 1 molar proportion of boron trichloride.

Further preferred are the complexes of formula

$$BCl_3 \cdot NRR^1R^2$$

where R, $R^1$, and $R^2$ each denote an alkyl hydrocarbon group of from 1 to 18 carbon atoms, an aralkyl hydrocarbon group of from 7 to 18 carbon atoms, a cycloalkyl hydrocarbon group of from 3 to 18 carbon atoms, or an aryl mononuclear hydrocarbon group of from 6 to 18 carbon atoms, or at least two of R, $R^1$, and $R^2$ form with the indicated nitrogen atom a 5- or 6-membered heterocyclic ring, which may have a benzene ring fused to the said heterocyclic ring, any remaining free valency being satisfied by a said alkyl, aralkyl, cycloalkyl, or aryl hydrocarbon group.

The particularly preferred complexes are of the formula

$$BCl_3 \cdot NR^3R^4R^5$$

where $R^3$ and $R^4$ are methyl groups and $R^5$ denotes an alkyl group of 1 to 16 carbon atoms, or $NR^3R^4R^5$ together denote pyridine.

As examples of accelerators there may be mentioned the complexes formed with:

aliphatic tertiary amines such as trimethylamine, tri-n-propylamine, and N,N-dimethyloctylamine;
aromatic tertiary amines, such as triphenylamine and N,N-dimethylaniline;
araliphatic tertiary amines such as N-benzyldimethylamine;
heterocyclic tertiary amines such as pyridine, picolines, lutidines, collidines, quinoline, isoquinoline, N-methylpiperidine, N-methylmorpholine, 1,4 - diazabicyclo - (2.2.2)octane, and hexa(N-methyl)-melamine; and
cycloaliphatic tertiary amines such as N-cyclohexyldimethylamine.

The new accelerators are, in general, readily prepared—see, for example, Gerrard and Lappert, Chem. Rev., 1958, 58, 1101 et seq.

The proportions of accelerator and of curing agent to be used will depend on factors such as the epoxide content of the epoxide resin used, the nature of the curing agent, and the curing conditions to be employed. Suitable proportions may readily be determined by routine experiment but, by way of illustration, from about 0.01 to 10, especially from about 0.1 to 2, parts by weight of the accelerator may be used per 100 parts by weight of the epoxide resin, or from about 0.05 to 10, and especially from about 0.5 to 5, parts by weight per 100 parts of the curing agent.

In the usual methods of manufacturing epoxide resins, mixtures of compounds of differing molecular weight are obtained, these mixtures ordinarily containing a proportion of compounds whose epoxide groups have undergone partial hydrolysis. The average number of 1,2-epoxide groups per molecule of the resin need not be an integer of value at least 2; it is generally a fractional number but must in any case be greater than 1.0.

Of the epoxide resins which may be used in the compositions of the present invention, the more suitable are those wherein the epoxide groups are terminal, i.e. of formula

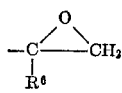

where $R^6$ denotes a hydrogen atom or a methyl group, particularly as 2,3-epoxypropyl groups directly attached to oxygen, nitrogen, or to sulphur atoms. Such resins include, for example, polyglycidyl and poly($\beta$-methylglycidyl) esters obtainable by the reaction of a substance containing two or more carboxylic acid groups with epichlorohydrin, glycerol dichlorohydrin, or $\beta$-methylepichlorohydrin in the presence of alkali. Such polyglycidyl esters may be derived from aliphatic carboxylic acids, e.g. oxalic acid, succinic acid, adipic acid, sebacic acid, or dimerized or trimerized linoleic acid, from cycloaliphatic carboxylic acids such as hexahydrophthalic, 4-methylhexahydrophthalic, tetrahydrophthalic and 4-methyltetrahydrophthalic acid, and from aromatic carboxylic acids such as phthalic acid, isophthalic acid and terephthalic acid.

Other epoxide resins which may be used include polyglycidyl and poly($\beta$-methylglycidyl) ethers, such as those obtainable by the reaction of a substance containing two or more alcoholic hydroxyl groups, or two or more phenolic hydroxyl groups, with the appropriate epichlorohydrin or glycerol dichlorohydrin under alkaline conditions, or, alternatively, in the presence of an acidic catalyst with subsequent treatment with alkali. Such polyglycidyl ethers derived from aliphatic alcohols, for example, ethylene glycol and poly(oxyethylene)glycols such as diethylene glycol and triethylene glycol, propylene glycol and poly(oxypropylene) glycols, propane-1,3-diol, butane-1,4-diol, pentane-1,5-diol, hexane-1,6-diol, hexane-2,4,6-triol, glycerol, 1,1,1-trimethylolpropane and pentaerythritol; from cycloaliphatic alcohols, such as quinitol, 1,1-bis(hydroxymethyl)cyclohex-3-ene, bis(4-hydroxycyclohexyl)methane and 2,2-bis(4-hydroxycyclohexyl) propane; and from alcohols containing aromatic nuclei, such as N,N-bis(2-hydroxyethyl)aniline and 4,4'-bis(2-hydroxyethylamino)-diphenylmethane. Preferably the polyglycidyl ethers are derived from a substance containing two or more phenolic hydroxyl groups, for example, resorcinol, catechol, hydroquinone, bis(4-hydroxyphenyl) methane, 1,1,2,2-tetrakis(4-hydroxyphenyl)ethane, 4,4'-dihydroxydiphenyl, bis(4-hydroxyphenyl) sulphone, and, especially phenol-formaldehyde or cresol-formaldehyde novolak resins, 2,2-bis(4-hydroxyphenyl)propane (otherwise known as bisphenol A) or 2,2-bis(3,5-dibromo-4-hydroxyphenyl)-propane.

There may further be employed poly(N-glycidyl) compounds, such as are, for example, obtained by the dehydrohalogenation of the reaction products of epichlorohydrin and amines containing at least two hydrogen atoms directly attached to nitrogen, such as aniline, n-butylamine, bis(4-aminophenyl)methane, bis(4-aminophenyl) sulphone, or bis(4-methylaminophenyl)methane. Other poly(N-glycidyl) compounds that may be used include triglycidyl isocyanurate, N,N'-diglycidyl derivatives of cyclic alkylene ureas such as ethyleneurea and 1,3-propyleneurea, and N,N'-diglycidyl derivatives of hydantoins such as 5,5-dimethylhydantoin.

Epoxide resins obtained by the epoxidation of cyclic and acyclic polyolefins may also be employed, such as vinylcyclohexene dioxide, limonene dioxide, dicyclopentadiene dioxide, 3,4-epoxydihydrodicyclopentadienyl glycidyl ether, the bis(3,4-epoxydihydrodicyclopentadienyl) ether of ethylene glycol, 3,4-epoxycyclohexylmethyl 3',4'-epoxycyclohexanecarboxylate and its 6,6'-dimethyl derivative, the bis(3,4-epoxycyclohexanecarboxylate) of ethylene glycol, the acetal formed between 3,4-epoxycyclohexanecarboxaldehyde and 1,1-bis(hydroxymethyl)-3,4-epoxycyclohexane, and epoxidized butadienes or copolymers of butadiene with ethylenic compounds such as styrene and vinyl acetate.

Especially suitable epoxide resins are polyglycidyl ethers of 2,2-bis(4-hydroxyphenyl)propane or of a novolak from phenol (which may be substituted in the ring by a chlorine atom or a hydrocarbon alkyl group of from 1 to 4 carbon atoms) and formaldehyde and having an epoxide content of at least 1.0 1,2-epoxide equivalent per kilogram.

Any heat-curing agent may be employed in the compositions of the present invention, however, as already indicated, the heat-curing agent is preferably a polycarboxylic acid, a polycarboxylic anhydride, an aromatic polyamine, a polycarboxylic acid polyhydrazide, a polyhydric phenol, dicyandiamide, or a compound having at least two primary amino groups attached to a 1,3,5-triazine nucleus.

When the curing agent is dicyandiamide there may be used from about 1 to 40 parts by weight of this hardener per 100 parts by weight of the epoxide resin.

Polycarboxylic acids which may be used include phthalic acid, 1,2,3,6-tetrahydrophthalic acid, hexahydrophthalic acid, isophthalic acid, terephthalic acid, adipic acid, 2,2,4- and 2,4,4-trimethyladipic acid, succinic acid, dodecenylsuccinic acid, maleic acid, citric acid, mellitic acid, and pyromellitic acid. The polycarboxylic acid may also be a carboxyl-containing polyester obtained by esterification with a polycarboxylic acid of a stoichiometric deficit of a polyol such as a propylene glycol, a polyoxypropylene glycol, and a polyoxypropylene triol. It may also be a polymerized ethylenically unsaturated carboxylic acid. Generally, from about 0.4 to 1.1 carboxylic acid equivalents of the polycarboxylic acid will be used per 1,2-epoxy equivalent of the epoxide resin.

Examples of polycarboxylic acid anhydrides which may be used are phthalic anhydride, methyl-1,2,3,6-tetrahydrophthalic anhydrides, hexachloroendomethylene-1,2,3,6-tetrahydrophthalic anhydride, maleic anhydride, succinic anhydride, nonenylsuccinic anhydride, polysebacic anhydride, polyazelaic anhydride, pyromellitic dianhydride, benzophenone-3,3',4,4'-tetracarboxylic acid dianhydride, 1,2,3,6-tetrahydrophthalic anhydride, methylenedomethylene-1,2,3,6-tetrahydrophthalic anhydride, hexahydrophthalic anhydride, and dodecenylsuccinic anhydride. Polycarboxylic acid anhydrides will normally be used in a proportion sufficient to provide from about 0.4 to 1.1 carboxylic acid anhydride equivalents per 1,2-epoxy equivalent of the epoxide resin, but if desired, up to 1.6 carboxylic acid anhydride equivalents per 1,2-epoxy equivalent may be used.

Aromatic polyamines suitable as curing agents are those containing at least three hydrogen atoms directly attached to nitrogen atoms of aromatic amine groups, for example m- and p-phenylenediamine, bis(4-aminophenyl) methane, bis(4-aminophenyl) ether, bis(4-aminophenyl) sulphone, bis(4-aminophenyl) ketone, and aniline-formaldehyde resins. Ordinarily, from about 0.75 to 1.25 aminohydrogen equivalents of the aromatic polyamine will be used per 1,2-epoxy equivalent of the epoxide resin.

Polycarboxylic acid polyhydrazides which may be used are, for example, isophthalyl dihydrazide, oxalyl dihydrazide, adipyl dihydrazide, and sebacyl dihydrazide. The quantity used of polycarboxylic acid polyhydrazide will normally be sufficient to provide about 0.35 to 0.6 of a hydrazide group (—CONHNH$_2$) per 1,2-epoxy group of the epoxide resin.

Examples of polyhydric phenols which may be used as hardening agents are resorcinol, hydroquinone, and, for preference, 2,2-bis(4-hydroxyphenyl)propane and novolaks from formaldehyde and phenol or phenol substituted in the ring by a chlorine atom or an alkyl group of not more than nine carbon atoms. Usually from about 0.75 to 1.25 phenolic hydroxyl equivalents of the polyhydric phenol will be used per 1,2-epoxy equivalent of the epoxide resin.

As examples of compounds having at least two primary amino groups directly attached to the same 1,3,5-triazine nucleus, apart from melamine, there may be mentioned guanamines such as laurylguanamine and substituted melamines such as N-n-butylmelamine and N,N-diallylmelamine. These hardeners are usually employed in a proportion of from about 1 to 40 parts by weight per 100 parts by weight of the epoxide resin.

The new compositions may further contain suitable plasticizers such as dibutyl phthalate, dioctyl phthalate or tricresyl phosphate, inert diluents, and so-called reactive diluents, especially monoepoxides such as, for example, butyl glycidyl ether, iso-octyl glycidyl ether, phenyl glycidyl ether, or glycidyl esters of synthetic, highly branched, predominantly tertiary, aliphatic monocarboxylic acids. They may also contain additives such as fillers, coloring matter, flow control agents, flame inhibitors, mould lubricants and the like. Suitable extenders and fillers are, for example, asphalt, bitumen, glass fibres, mica, quartz flour, cellulose, kaolin, wollastonite, or colloidal silica having a large specific surface such as that available under the registered trademark "Aerosil."

Depending on the reactivity of the unaccelerated resin hardener system and on its mode of use, the compositions of the present invention may be supplied as a one-, two- or three-part pack. In the case where it is supplied as a two-part pack, the accelerator may be incorporated in either the resin or the hardener part, or in both.

This invention therefore further includes within its scope (a) Compositions, which can be cured by a curing agent for expoxide resins, comprising an epoxide resin and an accelerator which is a complex of boron trichloride with an amine in which the amino nitrogen is solely tertiary;

(b) Compositions, suitable for curing epoxide resins, comprising a curing agent for epoxide resins and an accelerator which is a complex of boron trichloride with an amine in which the amino nitrogen is solely tertiary.

The curable compositions of this invention are particularly useful as laminating resins, surface coating resins, sinter powders, dipping or casting resins, moulding compositions, potting and insulating compounds for the electrical industry, and adhesives, and also in the manufacture of such products.

The following examples illustrate the invention. Unless otherwise specified, parts are by weight, and temperatures are in degrees centigrade. The new accelerators were prepared as follows.

BORON TRICHLORIDE-TRIMETHYLAMINE COMPLEX

Boron trichloride (165 g.) and trimethylamine (84 g.) were passed separately into a flask containing dry benzene (2 liters) in an atmosphere of nitrogen at 0°. On completing addition, the solution was stirred for 3 hours at 0° and then filtered. The filtrate was evaporated and the residue was combined with the residue from the filtration. The combined solid was recrystallized from ethanol to give boron trichloride-trimethylamine complex (231 g.), M.P. 242°. Elemental anlysis gave the following results: C, 20.53%; H, 5.26%; N, 7.90%. $C_3H_9N \cdot BCl_3$ requires: C, 20.42%; H, 5.13%; N, 7.98%.

BORON TRICHLORIDE-BENZYLDIMETHYL-AMINE COMPLEX

Dry N-benzyldimethylamine (125 g.) was stirred at 0° in dry benzene in an atmosphere of nitrogen, and boron trichloride (108 g.) in dry benzene was added slowly. On completing the addition, the mixture was stirred for 3 hours at 0°, then the precipitated solid was recrystallized from ethanol and dried to give white crystals of boron trichloride-benzyldimethylamine complex (143 g.), M.P. 131°. Elemental analysis gave the following results: C, 42.14%; H, 4.97%; N, 5.55%. $C_9H_{13}N \cdot BCl_3$ requires: C, 42.81%; H, 4.96%; N, 5.34%.

BORON TRICHLORIDE-OCTYLDIMETHYLAMINE COMPLEX

"Empigen 5015" (a commercial mixture of n-alkyldimethylamines in which n-octyldimethylamine predominates) (120 g.) was stirred in an atmosphere of nitrogen at 30 to 40° whilst boron trichloride (87 g.) was bubbled slowly through the mixture. A brown crude product was obtained which, on recrystallization from ethanol, gave white crystals of boron trichloride-octyldimethylamine complex (84.9 g.), M.P. 28°. The product had the following elemental analysis: C, 44.05%; H, 8.48%; N, 5.10%. $C_{10}H_{23}N \cdot BCl_3$ requires: C, 43.74%; H, 8.38%; N, 5.10%.

BORON-TRICHLORIDE-PYRIDINE COMPLEX

Boron trichloride (72 g.) was bubbled through dry pyridine (49 g.) in dry benzene at 0° in an atmosphere of nitrogen. When addition was complete, the mixture was stirred for 3 hours at 0°. The precipitated white solid was filtered off and recrystallized from ethanol to give boron trichloride-pyridine complex (118 g.), M.P. 114°. The product had the following elemental analysis: C, 30.05%; H, 2.38%; N, 6.91%. $C_5H_5N \cdot BCl_3$ requires: C, 30.56%; H, 2.55%; N, 7.13%.

The term "Martens point," unless otherwise specified, denotes the heat deflection temperature under load, as determined by a modification of the Martens D.I.N. procedure. A smaller sample, 76 mm. x 19 mm. x 3.2 mm. (compared with a sample size of 120 x 15 mm. x 10 mm. specified in the D.I.N. procedure) and a maximum fibre stress of 12.5 kg./sq. cm. (compared with the specified 50 kg./sq. cm.) were employed. Such results, while not necessarily the same as those which would be obtained by the original D.I.N. procedure, are, however, mutually comparable.

Gelation times at 100°, 120° and 135° were measured on a 15 g. sample in a boiling tube of 2.5 cm. diameter heated in an oil bath, using a "Techne" gelation timer. Gelation times at 154° were measured manually by means of a glass rod on 1 g. samples in a 10 mm. test tube heated in bromobenzene vapor.

"Epoxide resin I" denotes a polyglycidyl ether of 2,2-bis(4-hydroxyphenyl)propane, containing 2.2–2.5 epoxide equiv./kg.; its softening range, as measured by the ball and ring method, was 57 to 64°.

"Epoxide resin II" was likewise a polyglycidyl ether of 2,2-bis(4-hydroxyphenyl)propane, but was liquid at room temperature and it had an epoxide content of 5.0–5.2 equiv./kg.

"Epoxide resin III" was diglycidyl tetrahydrophthalate.

"Epoxide resin IV" was a polyglycidyl ether of a phenol-formaldehyde novolak, containing 5.54 epoxide equiv./kg.; its softening point, as measured by the ball and ring method (ASTM E-28) was 39°.

"Epoxide resin V" was a liquid polyglycidyl ether of 2,2-bis(4-hydroxyphenyl)propane, containing 5.54 epoxide equiv./kg.

"Epoxide resin VI" was an epoxidized acetal of Δ³-tetrahydrobenzaldehyde and 1,1-bis(hydroxymethyl)cyclohex-3-ene, having an epoxide content of 6.82 equiv./kg.

EXAMPLE 1

Mixtures were prepared, each containing 100 parts of epoxide resin I and 50 parts of tetrahydrophthalic anhydride, and, as indicated in Table I, an accelerator. These proportions correspond to an anhydride:epoxide ratio of approximately 1.5:1.

TABLE I

| | Accelerator | | | |
|---|---|---|---|---|
| | None | BDMA (0.5 part) | BCl₃·(CH₃)₃N (1 part) | BCl₃·(CH₃)₂NC₈H₁₇ (1 part) |
| T₁, Gel time at 100° (mins.) | 985 | 44 | 326 | 135 |
| T₂, Gel time at 154° (mins.) | 60 | 3.8 | 3.7 | 3.2 |
| Ratio T₁/T₂ | 16.4 | 11.6 | 89 | 42 |
| Martens point, degrees after 5 hours at 135° | 85 | N.D. | 110 | 109 |
| Martens point, degrees after 24 hours at 135° | 109 | N.D. | 109 | 115 |

BDMA=N-benzyldimethylamine.
N.D.=Not determined.

As can be seen from Table I, the gelation time at 154° of the composition containing 1 part of boron trichloride-trimethylamine was 3.7 minutes. The amount of a conventional accelerator, N-benzyldimethylamine, required to reduce the normal gelation time to the same exent was 0.5 part, but with this amount of N-benzyldimethylamine, the ratio of gelation times at 154° and 100° was much less favorable. The Martens points of the compositions of this invention show that they were substantially cured after heating for only 5 hours at 135°, whereas the unaccelerated composition was only partially cured after the same cure cycle.

EXAMPLE 2

In these experiments, the compositions contained 100 parts of epoxide resin II (i.e. one that was liquid at room temperature), 80 parts of hexahydrophthalic anhydride, and an accelerator as shown in Table II.

TABLE II

| | Accelerator | | | | |
|---|---|---|---|---|---|
| | None | BDMA (0.45 part) | BCl₃-pyridine (1 part) | BCl₃-trimethylamine (2 parts) | BCl₃-N-benzyl dimethylamine (1 part) |
| Initial viscosity at 23° (poises) | 9.0 | 9.0 | 9.0 | N.D. | 9.0 |
| Viscosity at 23° after 3 days at 23° (poises) | 10.7 | 76 | 10.5 | N.D. | 11.9 |
| Initial viscosity at 40° (poises) | 1.9 | 3.0 | 2.0 | 2.0 | 2.0 |
| Viscosity at 40° after 3 days at 40° (poises) | 4.9 | Gelled | 6.0 | 3.1 | 6.0 |
| Gel time at 120° (mins.) | N.D. | 6 | 9 | N.D. | 11 |
| Gel time at 154° (mins.) | 200 | 1.6 | 1.8 | 1.8 | 2.0 |

The proportion of N-benzyldimethylamine was chosen such that the gel time at 54° of the composition containing it was approximately the same as those compositions containing the boron trichloride complexes. However, the conventional accelerator was clearly not latent at this concentration, as shown by the composition containing it gelling quite rapidly at 40°.

EXAMPLE 3

The compositions tested contained 100 parts of epoxide resin II, 36 parts of bis(4-aminophenyl) sulphone, and no accelerator, a conventional accelerator (2-methoxyethyl hydrogen maleate), or a boron trichloride complex, as shown in Table III.

TABLE III

| | Accelerator | | | |
|---|---|---|---|---|
| | None | MEHM (0.4 part) | MEHM (2 parts) | BCl₃-trimethylamine (1 part) |
| Initial viscosity at 65° (poises) | 20 | 20 | 20 | 20 |
| Viscosity at 65° after 3 days at 40° (poises) | 35 | 200 | Solid | 35 |
| Gel time at 154° (mins.) | 57 | 53 | 31 | 29 |

NOTE.—MEHM=2-methoxyethyl hydrogen maleate.

It will be seen that, in the presence of sufficient boron trichloride complex to halve the gel time at 154°, there is little difference in reactivity at 40°. On the other hand, with the conventional accelerator, when a correspondingly effective amount was added, the pot-life was markedly lowered.

EXAMPLE 4

The gelation times at 154°, and the change in viscosity on holding at 60°, were determined for compositions containing 70 parts of epoxide resin III, 30 parts of epoxide resin IV, 57 parts of a technical mixture of 2,2,4-trimethyladipic acid and 2,4,4-trimethyladipic acid as hardening agent, and the accelerators indicated in Table IV.

TABLE IV

| | Accelerator | | |
|---|---|---|---|
| | None | TDMP (0.43 part) | BCl₃·(CH₃)₃N (1 part) |
| Gelation time at 154° (mins.) | 86 | 8.5 | 8.3 |
| Initial viscosity at 40° (poises) | 27 | 29 | 29 |
| Viscosity at 40° after 17 hours at 60° (poises) | 4,400 | 7,600 | 4,400 |

NOTE.—TDMP=2,4,6-tris(dimethylaminomethyl)phenol.

The amount of TDMP was chosen such that the gelation time at 154° of the sample containing it would be the same as that of the sample containing the boron trichloride-trimethylamine complex. It will be seen that the viscosity of the sample containing the complex on heating at 60° was the same as that of the control, but that the viscosity of a sample containing a conventional accelerator had increased sharply.

EXAMPLE 5

Mixtures were prepared, each containing 100 parts of epoxide resin II, 58 parts of a phenol-formaldehyde novolak (having a phenolic hydroxyl content of about 9 equiv./kg. and prepared from 0.85 molar proportions of formaldehyde per molar proportion of phenol), and, respectively, nil or 2 parts of boron trichloride-trimethylamine. Samples of the mixtures were applied, as 60% solutions in ethyl methyl ketone, to a metal surface at 140°, and the infusibility time at 140° was found by determining the interval after which the gelled film, on transfer to a metal surface at 200°, failed to melt. The infusibility time for the unaccelerated mixture was 80 minutes, while that for the mixture containing the boron trichloride complex was only 11 minutes.

EXAMPLE 6

To demonstrate that, under the conditions employed, the complexes act as accelerators rather than as co-hardeners, 100 parts epoxide resin V was mixed with 0.5 part boron trichloride-trimethylamine complex. The resulting mixture was cured with various amounts of isomerized methyltetrahydrophthalic anhydride (MTHPA) for 16 hours at 150°. The deflection temperature under load (D.T.L.) was determined according to British Standard No. 2782, Method 102G. The results are shown in Table V.

TABLE V

| | Parts of MTHPA | | | | | |
|---|---|---|---|---|---|---|
| | 20 | 35 | 50 | 65 | 80 | 100 |
| Anhydride equivalents per epoxy equivalent | 0.22 | 0.38 | 0.54 | 0.71 | 0.87 | 1.09 |
| D.T.L. (° C.) | 50 | 62 | 72 | 85 | 92 | 92 |

These results show that the highest deflection temperature is reached with a ratio of anhydride groups to epoxy groups of at least 0.9 to 1. If the BCl₃ complex acted as a co-hardener, i.e. if it were causing homopolymerization of the epoxide groups by an etherification reaction, the maximum D.T.L. would occur at a lower addition of MTHPA. Such results are, in fact, obtained when BF₃-ethylamine complex or stannous octoate are used in place of the BCl₃ complex used above.

EXAMPLE 7

A composition containing 100 parts of epoxide resin II, 5 parts of "Aerosil," 1 part of glycerol, 2 parts of boron trichloride-trimethylamine complex, and 7.5 parts of dicyandiamide, was found to have an infusibility time at 140° of 60 minutes; the comparable time for a composition, prepared in an identical way but omitting the accelerator, was 250 minutes,

EXAMPLE 8

A composition containing 100 parts of epoxide resin VI, 100 parts hexahydrophthalic anhydride, and 0.5 part boron trichloride-trimethylamine complex was found to have a gelation time of 24 minutes at 135°. A similar composition in which the boron trichloride-trimethylamine complex had been omitted had a gelation time of 208 minutes at 135°.

What is claimed is:
1. A heat-curable composition comprising:
  (a) an epoxide resin containing on average more than 1,2-epoxide group per molecule,
  (b) a curing amount of a heat-curing agent selected from the group consisting of a polycarboxylic acid, polycarboxylic acid anhydride, aromatic polyamine, polycarboxylic acid polyhydrazide, polyhydric phenol, dicyandiamide, and a compound having at least two primary amino groups directly attached to a 1,3,5-triazine nucleus, and
  (c) as accelerator for the heat-curing action, an accelerating amount of a complex of boron trichloride with an amine in which the amino nitrogen is solely tertiary.

2. A composition according to claim 1, in which the said amine is a monotertiary amine.

3. A composition according to claim 2, in which the said complex contains 1 molar proportion of the amine and 1 molar proportion of boron trichloride.

4. A composition according to claim 3, in which the said complex is of the formula $$BCl_3 \cdot NRR^1R^2$$

where R, R¹, and R² each denote a substituent chosen from the class consisting of alkyl hydrocarbon groups of from 1 to 18 carbon atoms, aralkyl hydrocarbon groups of from 7 to 18 carbon atoms, cycloalkyl hydrocarbon groups of from 3 to 18 carbon atoms, and aryl mononuclear hydrocarbon groups of from 6 to 18 carbon atoms.

5. A composition according to claim 3, in which the said complex is of the formula $$BCl_3 \cdot NRR^1R^2$$

where at least two of R, R¹, and R² denote, with the indicated nitrogen atom, a heterocyclic ring selected from the class consisting of heterocyclic rings having at least 5 and at most 6 members in the ring and heterocyclic rings have at least 5 and at most 6 members in the ring and having fused thereto not more than one benzene ring, any remaining free valency on the indicated nitrogen atom being satisfied by a substituent chosen from the class consisting of alkyl hydrocarbon groups of from 1 to 18 carbon atoms, aralkyl hydrocarbon groups of from 7 to 18 carbon atoms, cycloalkyl hydrocarbon groups of from 3 to 18 carbon atoms, and aryl mononuclear hydrocarbon groups of from 6 to 18 carbon atoms.

6. A composition according to claim 4, in which the said complex is also of the formula $$BCl_3 \cdot NR^3R^4R^5$$

where R³ and R⁴ each denote a methyl group and R⁵ denotes an alkyl group of from 1 to 16 carbon atoms.

7. A composition according to claim 5, in which NRR¹R² denotes pyridine.

8. A composition according to claim 1, containing from 0.01 to 10 parts by weight of the said accelerator per 100 parts by weight of the epoxide resin.

References Cited
UNITED STATES PATENTS

| 3,395,121 | 7/1968 | Pfann et al. | 260—47 |
| 2,839,495 | 6/1958 | Carey | 260—47 |
| 2,909,494 | 10/1959 | Parry et al. | 260—47 |

WILLIAM H. SHORT, Primary Examiner

T. E. PERTILLA, Assistant Examiner

U.S. Cl. X.R.

117—132 BE; 161—186; 260—2 N, 2EA, 2 EC, 9, 28, 30.4 Ep, 30.6 R, 31.8 E, 37 Ep, 47 EN, 47 EC, 59, 67 R, 77.5 NC, 78.4 Ep, 80.6, 94.6